United States Patent [19]

Kramer et al.

[11] Patent Number: 4,816,282
[45] Date of Patent: Mar. 28, 1989

[54] MOISTURE-STABILIZED FOODS HAVING IMPROVED SHELF LIFE

[75] Inventors: Colleen M. Kramer, Ridgewood, N.J.; Victor Landeryou, Warwick, N.Y.; Peter J. Schaeufele, Ringwood, N.J.

[73] Assignee: Lonza Inc., Fair Lawn, N.J.

[21] Appl. No.: 102,876

[22] Filed: Sep. 30, 1987

[51] Int. Cl.$^4$ .................. A21D 10/00; A23L 1/09
[52] U.S. Cl. .................. 426/549; 426/531; 426/658
[58] Field of Search .......... 426/531, 549; 127/129, 127/130, 658

[56] References Cited

U.S. PATENT DOCUMENTS 4,233,321 11/1980 Zenner et al. .................. 426/549
4,323,588 4/1982 Vink et al. .................. 426/568
4,503,080 3/1985 Brabbs et al. .................. 426/560
4,668,522 5/1987 Cappel et al. .................. 426/549

OTHER PUBLICATIONS

Webster's Ninth New Collegiate Dictionary, Merriam-Webster Inc., Springfield, Mass., 1986, p. 646.

Primary Examiner—Donald E. Czaja
Assistant Examiner—Helen Pratt
Attorney, Agent, or Firm—Bert J. Lewen; Henry Sternberg

[57] ABSTRACT

The shelf life of moisture-stabilized food, particularly baked goods, is improved by the addition of HSH having a carefully selected polymerization range. More particularly, the HSH comprises broadly from 60 to 85% of DP1, 10 to 25% of DP2, 1 to 5% of DP3, and 5 to 15% of DP4 or greater. From 2 to 20% of the HSH, 20 to 50% sugar and 5 to 50% water are present in the products, based on the total formulation.

7 Claims, 4 Drawing Sheets

GRANOLA BARS

MOISTURE-STABILIZED FOODS HAVING IMPROVED SHELF LIFE

BACKGROUND OF THE INVENTION

This invention relates to moisture-stabilized foods, particularly to baked, ready-to-eat flour-containing products. Among the products which can be prepared in accordance with this invention are crumb-structured products such as cakes, dumplings, breads, bagels, refrigerated biscuits, quick breads, syrups, jams, jellies, condensed milk, and pet foods.

With regard to flour-containing products, all normally contain, in the final good, gelatinized starch. In addition, the technology of this invention can be used to prepare brownies and cookies which are of higher sugar and lower water content than the products previously described as crumb-structured, and are further characterized in that they are usually not as high in gelatinized starches.

One of the problems with such products is their very short shelf life. This is a distinct disadvantage for baked goods if one intends such products to compete with fresh bakery goods. To compete with fresh-baked goods, the products must maintain their fresh-baked characteristics, i.e., moistness, eating quality, tenderness, good taste and flavor.

Providing shelf-stable prebaked and packaged products is not an easy task. It is known that "staling" occurs within a short period of time for fresh-baked goods. Thus, those prepared at a bakery for immediate sale have a very short shelf life, typically a day or two, up to at most one week. Packaging can extend that shelf life somewhat, but again such products inevitably will stale in a short time, typically within a week or two, at most. "Staling" involves many different physical and chemical factors. Texture staling is caused by recrystallization of the gelatinized starches, moisture drying, chemical changes causing flavor changes, and microbiological spoilage. Of particular importance is recrystallization of the starches.

During baking, most of the starches of the type used in crumb-structured products become gelatinized; specifically, the starch swells and takes on water, the starch cell bursts, and the granular structure is lost. After a period of time, the starch begins to crystallize and assume a rigid structure. Some of the water in the starch migrates to the protein portion of the baked goods, making the product tougher and the crumb structure more rigid, and giving the consumer the impression of a dried-out product, even though the moisture content is the same. This starch molecule recrystallization or realignment is one of the main problems which destroys long shelf life for baked, packaged and shipped bakery products.

Many attempts have been made to improve the texture and shelf life of baked goods. For example, U.S. Pat. No. 3,950,545 describes the addition of a water-soluble polyhydric alcohol to stabilize baked products, preferably adding from 3 to 15% glycerine. In U.S. Pat. No. 4,503,080, doughs and cookies having varied textures and storage stability are described. Certain compounds known commercially as Polyol 6075 and olyol HM75 (trademarks of Lonza Inc.) are described as crystallization inhibitors. The latter compounds, misdescribed in that patent as "starch hydrolysates," are used to replace the sugar in the baked goods' formulations.

Similarly, U.S. Pat. No. 4,456,625 describes the use of polyhydric alcohols, again preferably glycerine, to extend shelf life. In this patent, the water content of the baked goods is carefully controlled.

Though the foregoing techniques were to some degree effective in stabilizing the products, the degree of storage stability was not as great as desired and in certain instances the balance of properties desired of the end product could not be achieved. In addition, the flavor of the product is often less than satisfactory.

With regard to the non-flour-containing products mentioned above (that is, syrups, jams, jellies, condensed foods, and pet foods), while the above-described mechanism does not apply, such products also tend to dry out, crystallize, and lose consistency and product integrity, thereby reducing their shelf life. In the case of condensed milk, the discoloration affects consumer acceptance and, in effect, shortens the shelf life of this product also.

BRIEF DESCRIPTION OF THE INVENTION

In accordance with the instant invention, it has now been found that moisture-stabilized foods having outstanding taste and storage stability and, in the case of baked goods, also improved texture, may be obtained by incorporating within the formulations from 2 to 20%, based on total composition, of a hydrogenated starch hydrolysate (hereinafter "HSH") having a carefully selected dextrose polymerization range; at least 20% of sugar; and 5% water. More specifically, the polymerization range of the HSH useful in the invention is from 60 to 85% of DP1, 10 to 25% of DP2, 1 to 5% of DP3, and 5 to 15% of DP4 and higher. Generally, neither the sugar nor the water content would exceed 50% of the total composition. It has been found that the baked goods of the invention not only have improved texture and extended shelf life, but that they also retain the other desirable cross-section of properties necessary for commercial baked goods, even under conditions of low relative humidity, i.e., less than 50%.

DETAILED DESCRIPTION OF THE INVENTION

Figure 1:
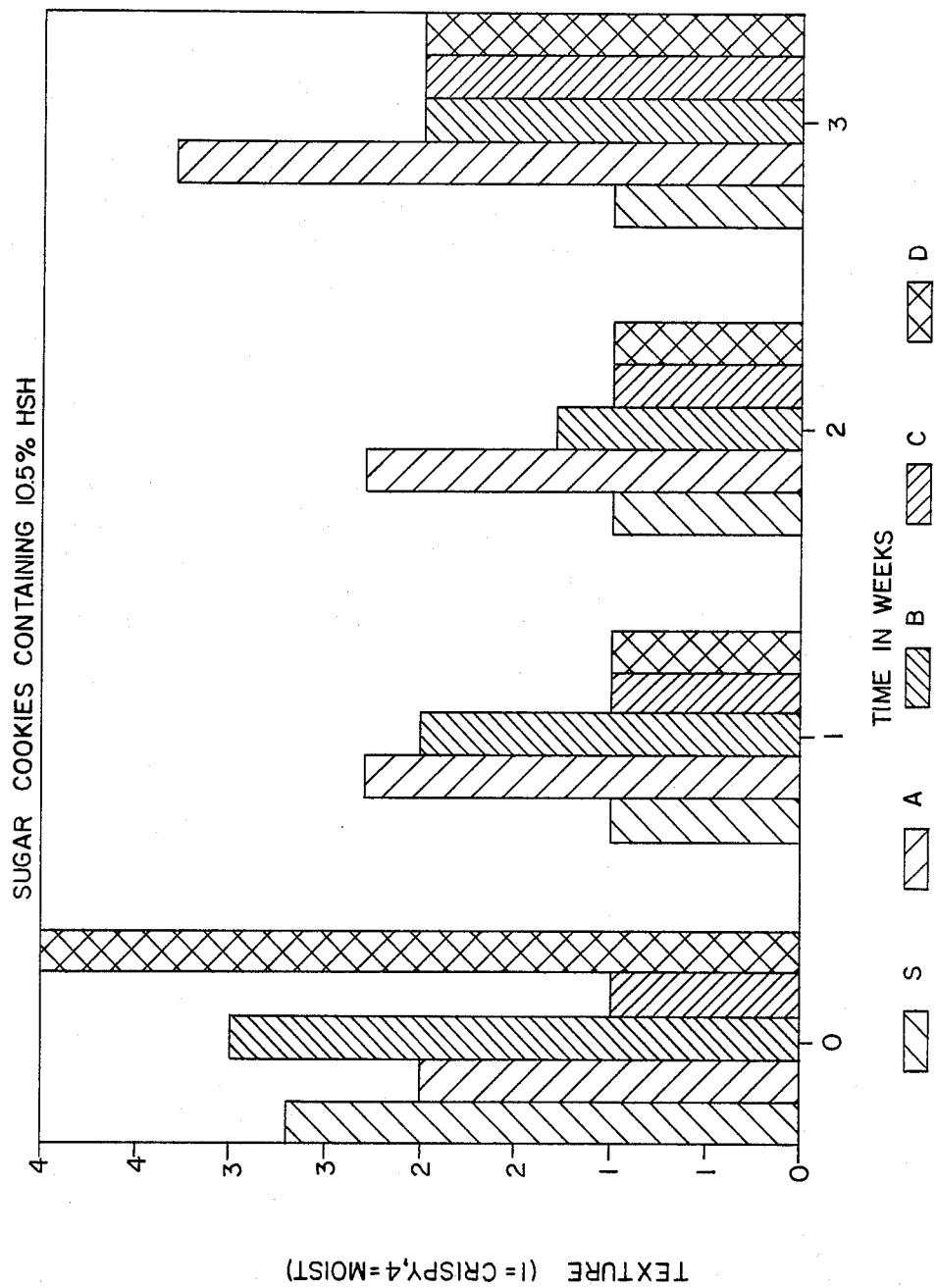
FIG. 1 illustrates the texture ranges versus times of baked goods containing various HSH compositions under low humidity conditions using 10.5% HSH.

The subject invention may be applied to a wide variety of moisture-stabilized foods. These materials, also sometimes referred to as intermediate moisture foods, are generally characterized by a moisture content of about 15 to 50% and an $a_w$ between 0.60 and 0.90. These foods are shelf-stable at ambient temperature for only limited periods of time. Such foods have been made for both animal and human consumption for many years.

The following table shows the $a_w$ values from traditional intermediate moisture foods.

TABLE

| Food Products | $a_w$ Range |
| --- | --- |
| Dried fruits | 0.60–0.75 |
| Cake and pastry | 0.60–0.90 |
| Frozen foods | 0.60–0.90 |
| Sugars, syrups | 0.60–0.75 |
| Some candies | 0.60–0.65 |
| Commercial pastry fillings | 0.65–0.71 |
| Some cereals | 0.65–0.75 |
| Fruit cake | 0.73–0.83 |
| Honey | 0.75 |
| Fruit juice concentrates | 0.79–0.84 |
| Jams | 0.80–0.91 |
| Sweetened condensed milk | 0.83 |
| Some fermented sausages | 0.83–0.87 |
| Maple syrup | 0.90 |
| Some ripened cheeses | 0.96 |
| Liverwurst | 0.96 |

The term "$a_w$" of a food system is calculated by dividing the number of moles of water in the material by the number of moles of water plus the number of moles of solutes. It will be understood, therefore, that, where a substance is solely water, the $a_w$ would be equal to 1.0. For a general discussion of intermediate moisture foods, reference is made to *Jay's Modern Food Microbiology*, D. Van Nostrand Co., New York, NY (1978), pp. 242–251, the disclosure of which is incorporated herein by reference.

In the case of baked goods, the particular composition of a batter will, as understood by those skilled in the art, vary widely, depending on the particular baked product desired. As a general matter, a typical dry mix formulation will contain the following basic ingredients:

| Flour Containing Dry Base | |
| --- | --- |
|  | Range of % Usage |
| Flour (high protein flour is used for breads) | 14–93 |
| Eggs | 0–15 |
| Sugar | 20–50 |
| Shortening | 0–55 |
| Yeast | 0–22 |
| Chemical leavening | 0–7 |
| Salt | 0–3 |
| Flavoring | 0–60 |
| Other minors such as preservatives, BHA, BHT, etc. | 0–1.5 |

This basic batter dry mix is added to other optional ingredients and a liquid portion such as water, to produce the desired specific product. The flour, as used herein, may be cereal flours, other grain flours, legume flours, and the like.

In conventional processing, the dry mix is added to water and mixed to form a batter which is cooked. When the batter is cooked, it results in a cake, bread, etc., which contains substantially completely gelatinized starches.

The composition of other moisture-stabilized foods is well known in the art. Examples of typical compositions are as follows:

| Pancake Syrup | |
| --- | --- |
| Ingredients | % |
| Sugar | 40.00 |
| Corn syrup solids | 10.00 |
| Flavor extract | 1.30 |
| Sodium benzoate | 0.10 |

| -continued | |
| --- | --- |
| Pancake Syrup | |
| Ingredients | % |
| Water | 48.40 |
| Color | . |
| Stabilizer | 0.20 |
|  | 100.00 |

In the above formulation, the flavoring extract can be vanilla, maple, or some concentrated fruit syrup. Citric acid is sometimes used in this type of syrup as a preservative in place of the sodium benzoate.

Sweetened condensed whole milk is another example of a moisture-stabilized food. Typically it contains 25 to 30% water, 8 to 12% fat, 5 to 10% protein, 10 to 15% lactose, and 30 to 50% sucrose.

With regard to jellies and jams, typical strawberry jam contains about 49% sucrose, 40% strawberries, about 10% water, and small amounts of pectin and citric acid solution. In making the jam, the pectin is first mixed with eight times its weight of sugar; the ingredients are mixed and brought to a boil and cooked to 70 to 72% soluble solids; the citric acid is added to the hot mix. A typical grape jelly may be made from 120 gal. of a Concord grape juice, 16° Brix, 1455 lb. of sweetener on a dry basis, 200 to 260 oz. of citric acid (anhydrous, 50% solution), 11.25 lb. of pectin dry blended with 40 lb. of sucrose.

It will be understood that the compositions of such moisture-stabilized foods are well known in the art and the proper balance of ingredients is to some degree a matter of personal preference. Accordingly, the ingredients may vary within wide limits.

In order to describe the invention more fully, the following examples are set forth:

EXAMPLE 1

A bland sugar cookie recipe was prepared, having the following composition:

| Ingredient | % Wt/Wt |
| --- | --- |
| Butter | 6.84 |
| Shortening | 20.50 |
| Whole eggs | 12.43 |
| Sugar | 32.32 |
| All-purpose flour | 27.60 |
| Salt | 0.25 |
| Vanilla | 0.06 |
|  | 100.00 |

By substituting various HSHs for 25% and 50% of the sucrose in the composition and adjusting the added water so that the variants all contained the same amount of water, the following formulations were prepared:

| Ingredients | 25% Sugar Substitution % Wt/Wt | 50% Sugar Substitution % Wt/Wt |
| --- | --- | --- |
| Butter | 6.66 | 6.66 |
| Shortening | 19.97 | 19.97 |
| Whole eggs | 12.10 | 12.10 |
| Sugar | 23.60 | 13.10 |
| HSH | 10.50 | 21.00 |
| All-purpose flour | 26.87 | 26.87 |
| Salt | 0.24 | 0.24 |
| Vanilla | 0.06 | 0.06 |

-continued

| Ingredients | 25% Sugar Substitution % Wt/Wt | 50% Sugar Substitution % Wt/Wt |
|---|---|---|
| | 100.00 | 100.00 |

The ingredients were combined by first creaming the butter and shortening, then adding the eggs and sweeteners and the dry-mixed flour and salt. The ingredients were mixed for 3 minutes and dropped onto baking sheets and thereafter baked for 13 minutes at 350° F.

Each batch of cookies was cooled and placed in a zip-loc bag on Day 1 of the testing schedule. After 2 days in storage (simulating bakery production schedules), the initial taste evaluation was made and twelve cookies from the batch were placed in a humidity chamber at 42% R.H. at 20° C. Samples were then evaluated from the humidity chambers and the zip-loc bag weekly for three weeks. Three trained taste panelists evaluated each sample. The "control" cookie contained 100% sucrose ("S") and no added water, and was prepared fresh for each test. Thus, each variant received realistic (zip-loc storage with weekly opening and resealing) and stressed (42% R.H., 20°C.) treatment and was compared to a freshly baked sugar cookie.

Figure 2:
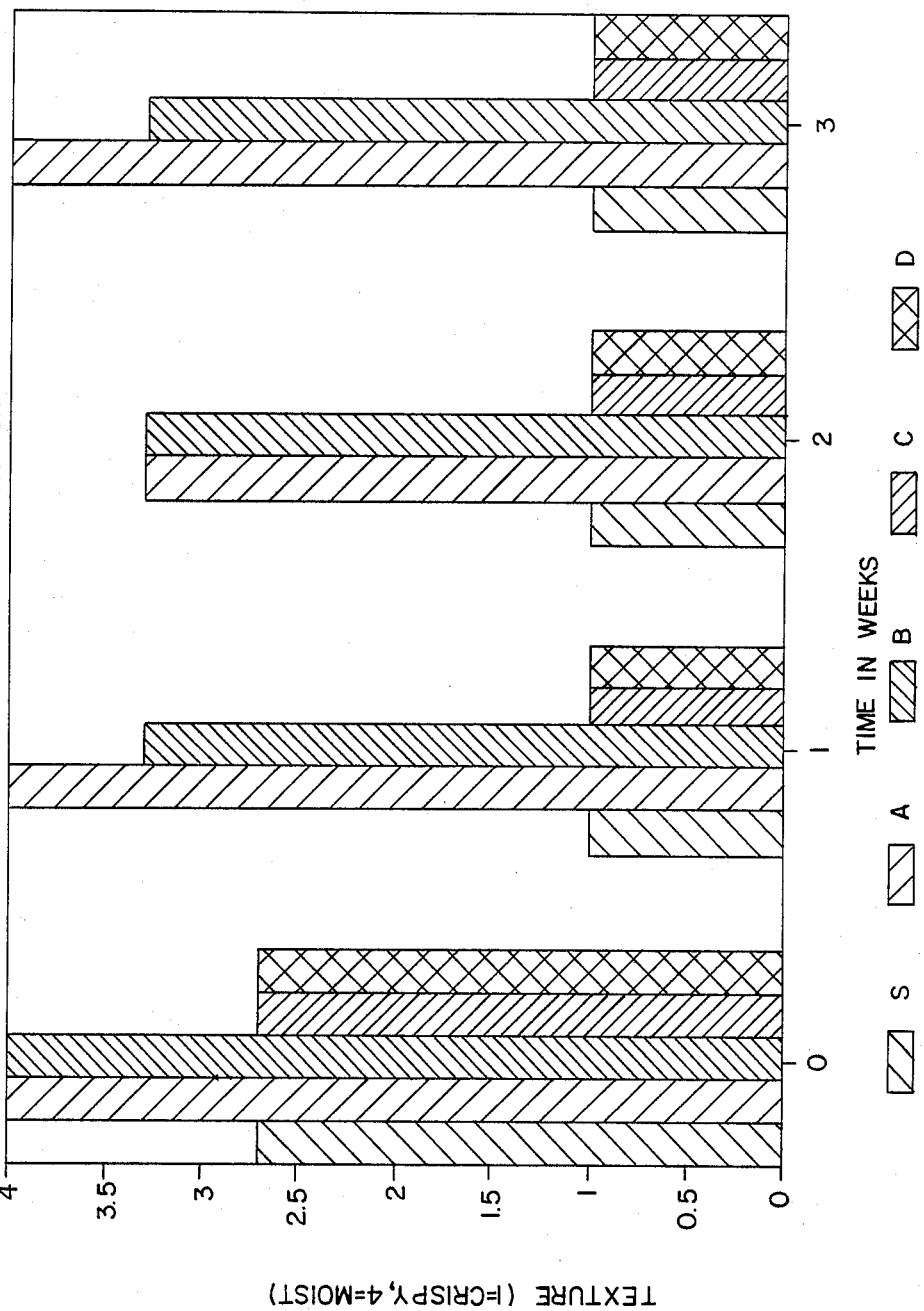
FIG. 2 shows the change in texture with respect to time of baked goods containing various HSH compositions under conditions of low humidity storage using 21% HSH.

The cookies were rated on the following four-point scale:
1 = Crispy throughout
2 = Crispy edges/moist middle
3 = Crispy middle/moist edges
4 = Moist throughout The results of the taste tests are shown in FIGS. 1 and 2. Data points between 1 and 4 are the result of averaging.

The following table shows the polyol distribution of each of the HSH products tested:

TABLE

| Polyol Distr. % | Hydrogenated Starch Hydrolysate Type | | | |
|---|---|---|---|---|
| | A | B | C* | D** |
| DP-1 | 70 | 45 | 14 | 13 |
| DP-2 | 15 | 25 | 8 | 50 |
| DP-3 | 2 | 8 | 10 | 12 |
| DP-4 | 13 | 22 | 68 | 25 |

*Polyol 6075, Trademark of Lonza Inc.
** Polyol HM-75, Trademark of Lonza Inc.

The analysis of the figures clearly shows the superiority of the texture with respect to time of the HSH formulations of the invention. Considering first FIG. 1, it will be noted that initially the HSH D received the best score in the test. However, after a period of time the ratings for this composition fell off markedly, with the HSH A of the invention showing the best result. Of significance here is the fact that the results obtained over the three week period for the HSH A was substantially constant. This is more important than the absolute level achieved, since the formulation of the cookies may be adjusted most easily where the texture remains comparatively constant over the time period.

FIG. 2 agains shows this advantage, with the HSH A being most outstanding. Here, under the low humidity storage conditions, the texture of the cookies containing the HSH A actually improved with time, while the HSH C and D, though moderately good in the initial tests, dropped off over the three week period of the test.

Additionally, the cookies where no changes were made in the original formulation (that is, none of the sugar was replaced), a rapid deterioration of texture over the time periods is noted. Similarly, in compositions where the sugar was replaced with the high fructose corn syrup, extremely poor scores on the rating tests resulted, both in controlled storage and low humidity storage.

EXAMPLE 2

A chocolate chip cookie formulation was prepared from the following ingredients:

| Part | Ingredient | % Wt/Wt |
|---|---|---|
| A | Sweet, unsalted butter | 19.13 |
| | Brown sugar | 13.43 |
| | Sucrose | 8.20 |
| | HSH A | 2.00 |
| B | Whole, fresh eggs | 8.46 |
| | Vanilla - Virginia Dare's Natural, Artificial 10X Vanilla | 0.04 |
| C | Flour | 18.89 |
| | Baking soda | 0.34 |
| | Salt | 0.55 |
| | Semi-sweet chocolate chips | 28.90 |
| | | 100.00 |

In preparing the cookie, the ingredients of part A are first creamed together and then the part B ingredients are admixed until the blend is fluffy. The dry-mixed ingredients of part C are then added and mixed for 2 minutes, and finally the chocolate chip are stirred into the mixture. The cookies are prepared on an ungreased cookie sheet by baking for 13 min. at 350° F.

Figure 3:
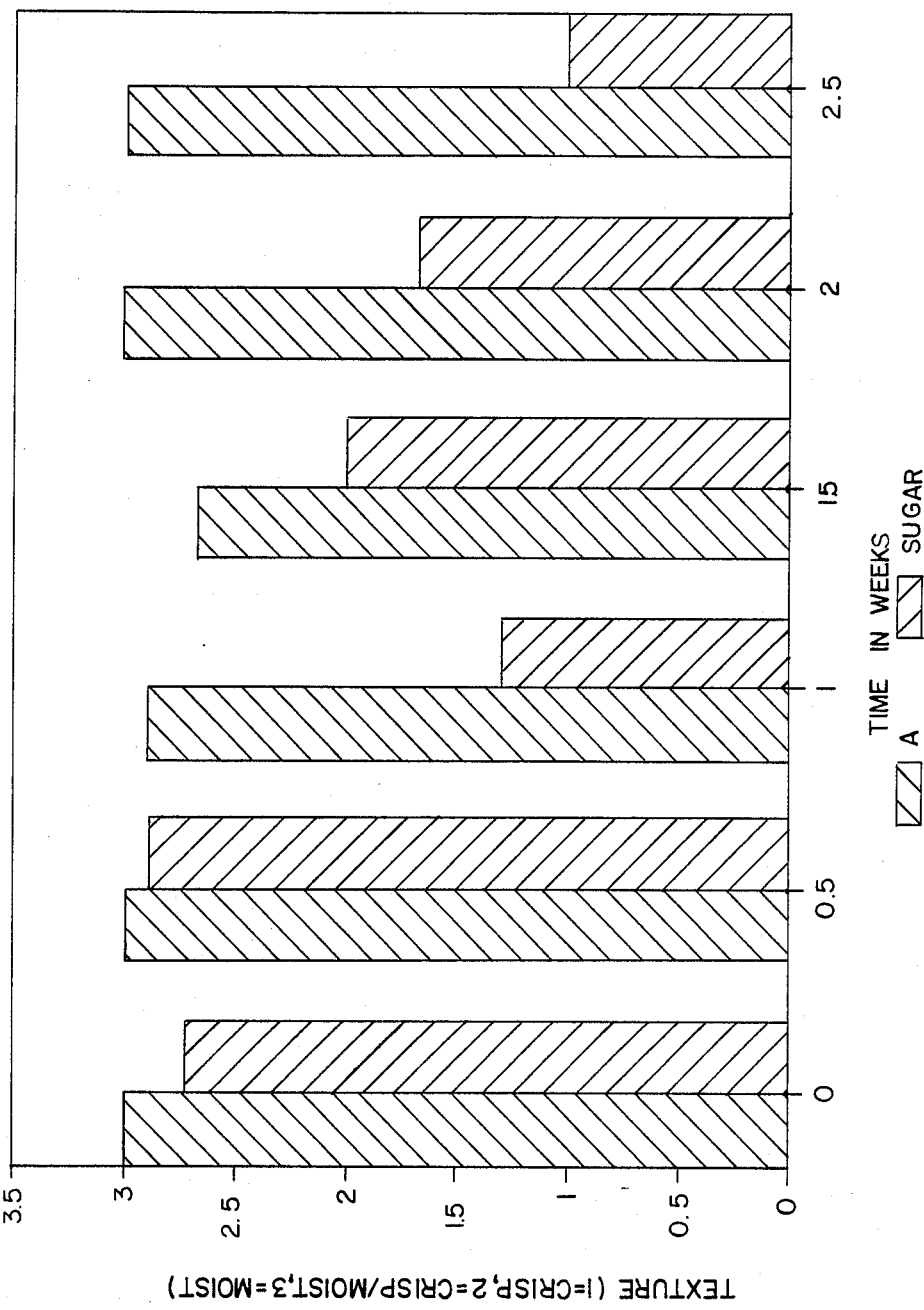
FIG. 3 shows the change in texture with respect to time of chocolate chip cookies using HSH as compared to a product using only sugar.

FIG. 3 shows the results of a texture test over time of the composition containing the 2 parts by weight of the HSH A to a composition which contains 10.20 parts of sucrose. Here the cookies were prepared, cooled and placed in zip-loc bags. They were tasted initially and then at half-week intervals for 2.5 weeks. A trained ten-member taste panel was used and the scale was as follows:
1 = Crispy throughout
2 = Crispy edges/moist middle
3 = Moist throughout Fractional values are the result of averaging. It is readily observed that, while the texture is comparable within the first few days, after one week the texture of the composition containing only the sugar deteriorates rapidly while that containing the HSH of the invention is comparable to the texture of the initially prepared cookie.

EXAMPLE 3

A granola bar was prepared with the following ingredients:

| Part | Ingredients | % Wt/Wt |
|---|---|---|
| A | Rolled oats | 16.42 |
| | Wheat germ | 7.12 |
| | Crisp rice | 7.12 |
| | Sweetened coconut | 8.44 |
| | Raisins | 7.12 |
| | Slivered almonds | 8.64 |
| B | Honey | 8.15 |
| | Brown sugar | 14.26 |
| | HSH A | 18.34 |
| | Corn oil | 4.27 |
| | Vanilla | 0.12 |
| | Cinnamic aldehyde | 0.01 |
| | | 100.00 |

To form the finished granola bar, initially the oats, coconut, almonds and crisp rice are ground. The ingredients of Part A and of Part B are thoroughly mixed separately. Thereafter, the two parts are mixed together and the composition pressed into a baking pan and baked at 350° F. for 25 min., cut and cooled.

Figure 4:
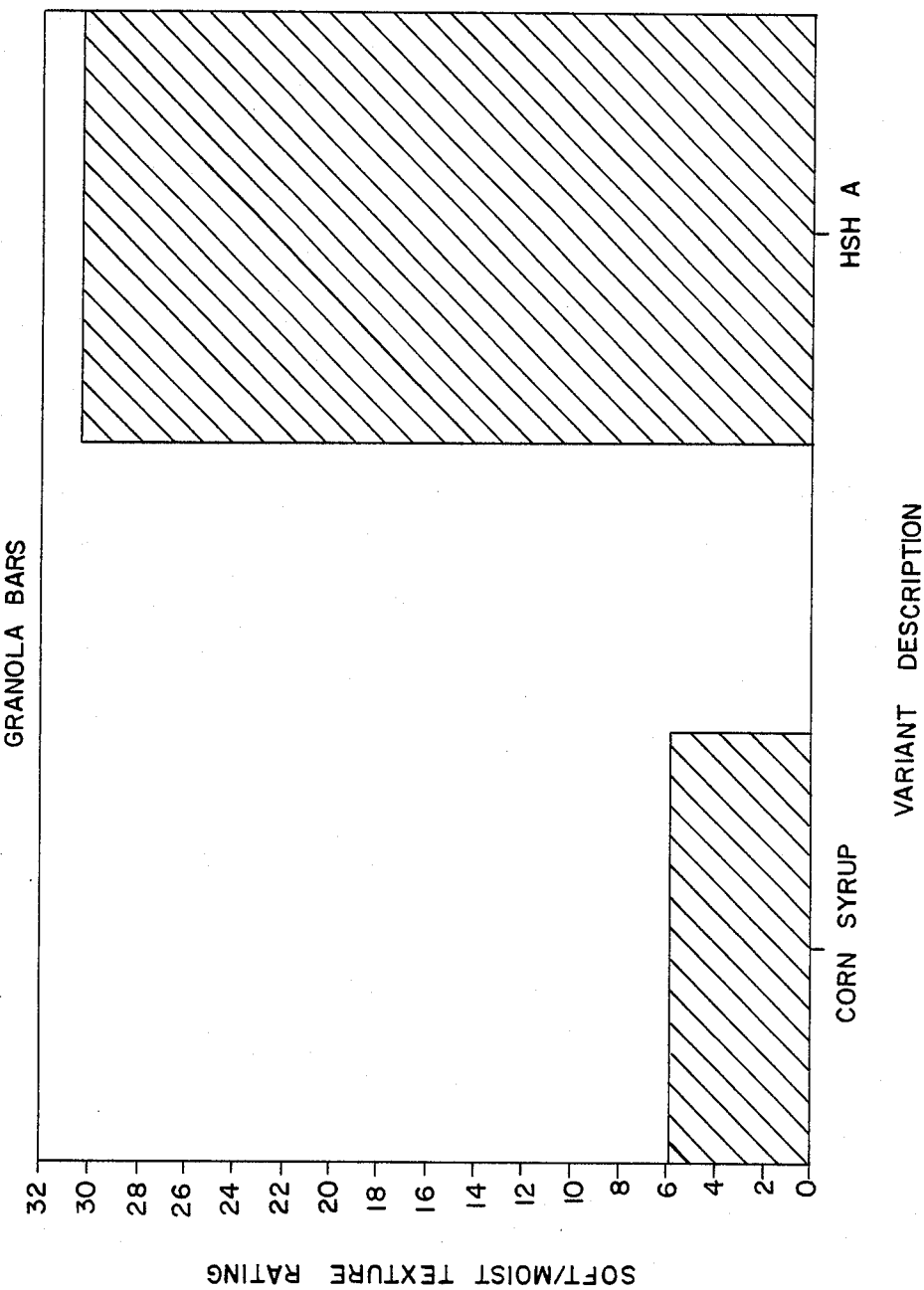
FIG. 4 compares the texture of granola bars.

Due to the magnitude of the difference between corn syrup and HSH variants, an initial evaluation was all that was required to show the superiority of the HSH. The samples were rated along a hedonic line scale with the following anchor points:

6=Extremely hard/dry
19=Mostly hard/dry
30=Neither hard/dry nor soft/moist
43=Mostly soft/moist
54=Extremely soft/moist FIG. 4 illustrates a comparison of a granola bar prepared with the HSH of the invention and a second composition using, in its place, corn syrup.

We claim:

1. A moisture-stabilized food composition which contains from 2 to 20% by weight of a hydrogenated starch hydrolysate consisting of from 60 to 85% DP1 components, 10 to 25% DP2 components, 1 to 5% DP3 components, and 5 to 15% of DP4 and higher components; 20 to 50% sugar and 5 to 50% water.

2. The composition of claim 1 wherein the food is a baked good containing from 14 to 93% flour on a dry basis.

3. A baked good composition containing 2 to 20% by weight of a hydrogenated starch hydrolysate consisting of 60 to 85% DP1 components, 10 to 25% DP2 components, 1 to 5% DP3 components, 5 to 15% DP4 and high components; 20 to 50% sugar, 5 to 50% water; and, on a dry basis, 14 to 93% flour, up to 55% shortening, up to 15% eggs, and up to 3% salt.

4. The baked good composition of claim 3 wherein the baked good is a cookie having an $a_w$ range of from 0.6 to 0.9.

5. The moisture-stabilized food composition of claim 1 wherein the composition is a syrup having an $a_w$ range of 0.6 to 0.9 and a water content of approximately 50%.

6. The moisture-stabilized food composition of claim 1 wherein the composition is a jam containing fruit and pectin and having an $a_w$ range of from 0.8 to 0.91, a sugar content of about 50%, and a water content of about 10%.

7. The moisture-stabilized food composition of claim 1 wherein the composition contains from about 25 to 30% water, 8 to 12% fat, 5 to 10% protein, 10 to 15% lactose, and 30 to 50% of sugar and the hydrogenated starch hydrolysate.

* * * * *